Patented Feb. 14, 1928.

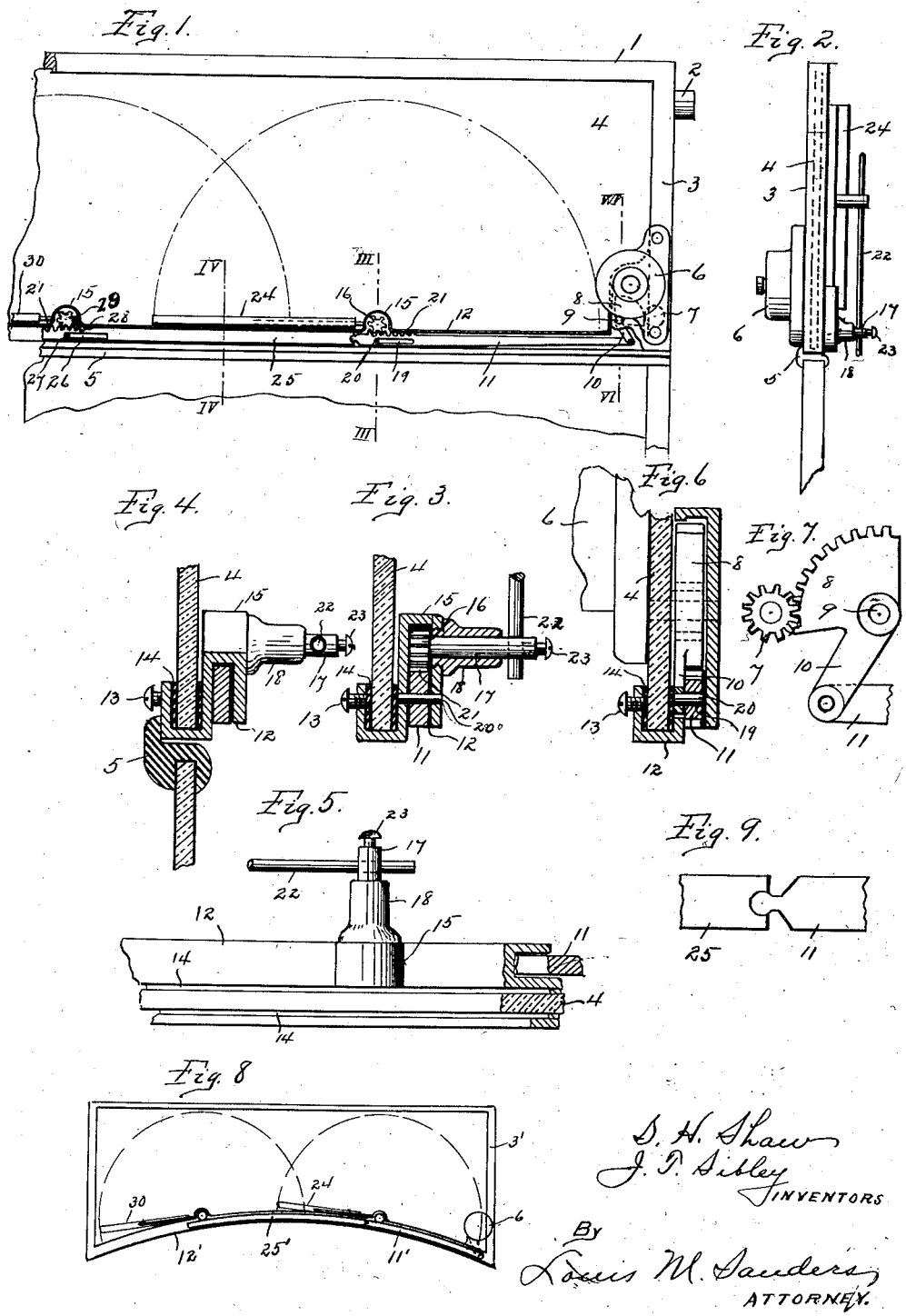

1,659,219

UNITED STATES PATENT OFFICE.

SAMUEL H. SHAW AND JAMES T. SIBLEY, OF NEW YORK, N. Y.

WINDSHIELD WIPER.

Application filed September 8, 1924. Serial No. 736,472.

The object of our invention is to provide a windshield wiper of a character which will give a clear vision for the full width of an automobile windshield. In the ordinary construction of a windshield wiper the mechanism consists usually of a motor having means for oscillating the wiper blade back and forth through the arc of a circle the center of which is in the near vicinity of the upper edge of the frame of the windshield itself, and only a comparatively small portion of the cleaned area comes within the range or line of vision leaving the remainder of the windshield coated with a film of moisture or snow and thereby obscuring the vision of a person who may be sitting at the rear of the windshield. Another defect inherent in the common method of applying the windshield cleaner resides in the fact that since the center of the oscillating wiper is located at the upper edge of the windshield and sweeps back and forth over its outer face, it necessarily carries the water or snow to the upper edge of the shield at each stroke and upon the reversal of the stroke leaves it there to drip in streamlets over the line of vision. These defects in the usual construction and operation of the windshield are overcome in our improved device, first by attaching the wiper to the lower edge of the windshield, locating the motor adjacent to the corner of the frame, and then locating a pair of wipers with their centers of oscillation substantially at the lower edge of the frame with means for oscillating said wipers back and forth connected directly to the motor. In this manner we are able to clear substantially the entire effective area of the windshield and thereby afford clear vision both for the driver of the car and for the passenger seated at his side. In carrying out our invention we make use of the structure substantially as illustrated in the accompanying drawing wherein—

Fig. 1 is a general view of the rear or inside face of a windshield showing the location of the motor at the lower right hand corner of the same and a pair of wipers connected in tandem to be operated thereby.

Fig. 2 is an end elevation of the same.

Fig. 3 is a section on line III—III of Fig. 1.

Fig. 4 is a section on line IV—IV of Fig. 1.

Fig. 5 is a fragmentary plan of the structure showing the location and relative position of the wiper mechanism with respect to the windshield glass.

Fig. 6 is an end view partly in section on line VI—VI of Fig. 1, showing the motor connection with the wiper racks.

Fig. 7 is a gear plan of the connection.

Fig. 8 is a view showing the application of the device to the curved windshield.

Fig. 9 is a detail.

Similar reference numerals refer to like parts throughout the specification and drawing.

The swinging windshield 1 is of any usual or preferred type the same being pivoted in a body frame (not shown) by means of trunnions 2, and is made up of the metallic frame 3 and the glass 4. The lower edge of the glass is left free and as usually constructed is designed to engage a rubber batten 5 which is secured to the lower section of the windshield.

Our improved shield wiper is secured to the lower edge and right end portion of the frame of the windshield. It consists of a motor 6, which if desired may be of the type illustrated in the application of James T. Sibley Ser. No. 725,617, filed July 12, 1924, the operating feature of which consists of a rotating pinion 7, having means for rotating the same first in one direction and then in the other. This pinion is actuated by mechanism upon the interior of the motor in substantially the same manner as described in aforesaid application and needs no further description here. Any motor which is capable of producing a reciprocating motion may be readily adapted to accomplish the results sought for in our invention. In the present case the pinion 7 meshes with a segmental rack 8 pivoted upon the windshield at 9 and having a depending arm 10 to the extremity of which is coupled a reciprocating rack bar 11 which is guided in a channel 12, said channel being secured to the lower edge of the shield glass 4. The means for securing said channel to the glass consists of a series of set screws 13 passing through a flange of the channel 12 and clamping against strips of rubber 14. This channel is of substantially S shape in cross section with the reciprocating bar 11 enclosed in one section of the channel while the other section of the channel embraces the lower edge of the windshield glass and is secured thereto as above described. The channel 12 is of a length sufficient to extend completely across the lower edge of the windshield. At suitable intervals in this channel offset recesses 15 are provided which serve as housings for the small pinions 16 mounted upon the shafts 17 and journaled in the bearings 18 as clearly shown in Fig. 3. The inner end of the bar 11 is provided with a slot 19 through which the pin 20 is inserted and secured in the flanges of the channel 12. The adjacent end of the bar 11 is provided with rack teeth 21 to engage the teeth of the pinion 16. Upon the outer end of the shaft 17 the wiper arm 22 is secured as by means of a set screw 23.

From this structure it will be noted that as the motor drives the pinion 7 first in one direction and then in the other the segmental gear 8 is given an oscillating motion which is converted into a reciprocating motion of the bar 11 thereby swinging the wiper arm 22 and its wiper 24 in the arc of a circle as indicated. Connected to the end of the reciprocating bar 11 by any convenient means of coupling is a second reciprocating bar 25 provided with a slot 26 through which a pin 27 is inserted to guide the same in the channel 12. The bar 25 is provided with rack teeth 28 similar in all respects to the rack teeth 21 and they engage a pinion 29 and drive a second wiper arm 30 the parts being substantially the same in all respects as those above described. It will be obvious when the motor 6 is set into operation that the rack 8 will be oscillated, thereby oscillating arm 10 and the arm 10 will reciprocate the bar 11. The bar 25 being coupled to the bar 11 will likewise be reciprocated and the bars 11 and 25 will oscillate the pinions 16 and 29. The oscillation of these pinions will oscillate the shafts connected therewith which support or carry the wiper arms. As shown the cleaned areas effected by the two wipers 24 and 30 overlap each other so that substantially the entire windshield is cleaned and the act of cleaning or wiping carries the snow or moisture to the lower edge of the windshield where it may drip off without again interfering with the line of vision.

In some automobiles the lower edge of the windshield is constructed on a curve to conform with the shape or dash as illustrated in Fig. 8. In such case the channel 12' corresponding with the channel 12 above described, is given the same curve as are also the rack bars 11' and 25', all other parts of the structure remaining the same as heretofore described.

From the foregoing, it will be seen that we have designed a form of windshield wiper whereby substantially the entire effective surface of the windshield may be cleared of snow or moisture and at the same time the tendency for such moisture to drip down over the cleared section is avoided.

Any of the usual forms of motors for reciprocating the rack bars 11 and 25 may be used and we find that the motor described in the above named application of James T. Sibley is very effective for the purpose of our improvement, we therefore do not claim specifically a form of motor but confine our claims to the structure of the duplex wiper and the immediate mechanism in connection therewith for operating the same.

We claim:—

1. In a windshield wiper, a channel bar S-shaped in cross-section, one of the channels of which embraces and is clamped to the lower edge of a windshield, a reciprocating rack bar guided in the other channel of said bar, a pinion engaging said rack bar, a wiper arm and wiper connected to said pinion, and a motor connected to said rack bar for reciprocating the same and to thereby oscillate said wiper over the face of said windshield.

2. In a windshield wiper, a motor adapted to be attached to a windshield near one corner thereof, a channel bar having a plurality of channels, one adapted to embrace an edge of the windshield, a reciprocating rack bar guided in the second channel of said bar, a windshield wiping element actuated by the rack bar, and a gear connection between the rack bar and the motor for reciprocating the rack bar.

SAMUEL H. SHAW.
JAMES T. SIBLEY.